United States Patent Office 3,424,614
Patented Jan. 28, 1969

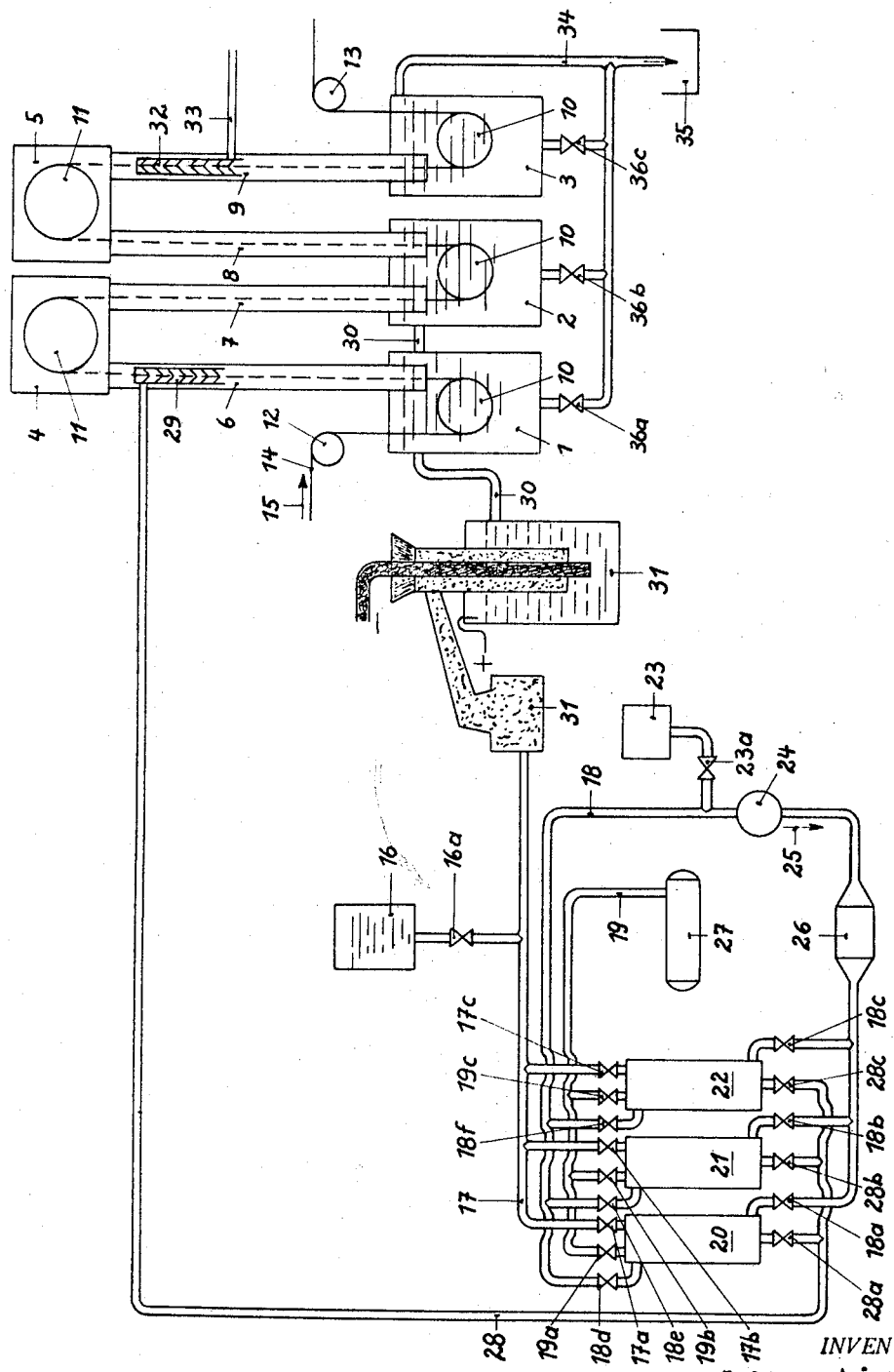

3,424,614
CLEANING, PARTICULARLY DE-SCALING,
OF METAL ARTICLES
Albert Lichte, Wuppertal-Elberfeld, Germany, assignor to Schloemann Aktiengesellschaft, Dusseldorf, Germany, a corporation of Germany
Continuation-in-part of abandoned application Ser. No. 347,569, Feb. 26, 1964. This application Oct. 30, 1967, Ser. No. 679,116
Claims priority, application Germany, Feb. 28, 1963, Sch 32,851
U.S. Cl. 134—2
Int. Cl. C23g 1/22
3 Claims

ABSTRACT OF THE DISCLOSURE

A method of cleaning metallic articles from oxidic surface contaminations by spraying the articles, in a treatment chamber shut off from the atmosphere and freed from atmospheric oxygen, with a mist of an alkali metal melt enriched with sufficient alkali metal hydride to descale the contaminations, and then removing the reduced scale by spraying the articles with a neutral liquid.

Excess alkali metal hydride may be added to the melt to maintain an oxygen-free atmosphere by reacting with any atmospheric oxygen present; and the product of this reaction may be collected and employed as a liquid seal for the treatment chamber.

---

This application is a continuation-in-part of my pending application Ser. No. 347,569 filed Feb. 26, 1964, for "Cleaning, Particularly De-scaling, of Metal Articles," now abandoned.

This invention relates to a process for the cleaning of metal articles by cleansing them from oxidic surface contaminations, particularly for the continuous de-scaling of endless metal bands.

In the rolling or annealing of steels, the surface of the metal becomes covered with a coating of oxide, the so-called scale. In the case of unalloyed and low-alloyed steels, this scale consists, according to the annealing temperature, of two or more layers, which are formed from the various oxides of iron and the mixed crystals thereof. In the case of high-alloyed steels, the scale also contains, in addition to the oxides of iron, oxides of the alloying constituents. The coatings of scale, which are usually very hard and very firmly adherent, must however be removed before the further treatment.

Besides various purely mechanical methods of removing scale, a number of chemical methods are known for detaching and removing the scale. Those most frequently adopted hitherto are pickling processes, in which the scale is detached by treating the metals with aqueous solutions of acid, sometimes with the assistance of an electric current. These methods of de-scaling have the disadvantage that large quantities of waste water containing acids frequently accrue, which have to be neutralised or otherwise rendered innocuous before they can be discharged. Moreover difficulties incidentally arise which are based upon the chemical passivity of the layers of oxide that form the scale. If in such cases more energetically acting treatment media are applied, not only are the oxide layers removed, but the foundation metal thereunder is also more or less attacked. Thus, in particular, in the de-scaling of rustless steels, the "pickling losses" that occur, owing to the removal of a certain proportion of the metallic surface of the foundation metal, are particularly high, and give rise to considerable expense on account of the high price of such high-grade alloys.

Now in order to provide a remedy for the difficulties described above, a further chemical de-scaling method has already been developed, in which a melting bath is adopted which is sometimes suitable, and which consists primarily of alkali hydroxide, and contains small percentages by weight of alkali-metal hydride. Upon immersing the metal articles to be cleaned in this melting bath, the alkali-metal hydride dissolved in the melt reacts very quickly and powerfully with the oxidic and other layers of scale. In the reaction of the alkali-metal hydride with the oxidic scale, alkali hydroxide is formed, which moreover is the carrier substance of the bath. The strong reducing action of the alkali-metal hydride renders it possible to shorten considerably the treatment times that are otherwise usual in the conventional de-scaling and pickling processes. Here only the oxides are reduced. No reaction takes place with the foundation metal located thereunder; and consequently there is no so-called "pickling loss." Furthermore, in the de-scaling operation with alkali-metal hydride, as contrasted with the acid pickling treatment, no atomic hydrogen is formed, by which the otherwise usual pickling embrittlement is conditioned. Finally, in the interaction with the after-treatment baths, consisting of water, dilute sulphuric acid, dilute nitric acid and borax solution, only comparatively small quantities of practically neutral waste waters are produced.

Notwithstanding all these advantages, this hydride immersion-bath process has not proved a success in the treatment for instance of continuous metal bands in a continuous method of working.

The melt most frequently adopted in the hydride process consists of molten sodium hydroxide, since this is comparatively cheap, and does not attack most metals, particularly steels, and also chromium, nickel, copper and the precious metals, as well as cast iron. The sodium hydride required for the process is produced by bringing sodium metal and hydrogen together into the melt, where they enter comparatively quickly into reaction under the influence of the temperature of the melting bath, and react to give sodium hydride. Experiments have shown that with a melting-bath temperature of about 370° C. and a sodium-hydride content of about 1.7 percent, the most economical de-scaling can be effected if the reaction time, the sodium and hydrogen consumption, and the treatment time necessary for the de-scaling, are brought into an appropriate relation with one another. If the temperature of the bath is below 370° C., the speed of reaction of the sodium and hydrogen diminishes, so for this reason a longer time is necessary for producing the requisite quantity of sodium hydride. Moreover owing to the longer period of remaining in the melt, the losses of sodium hydride become comparatively large. If the temperature is raised, the speed of reaction does indeed increase, but owing to the greater decomposition pressure connected herewith, and the higher losses by volatilization of sodium, only a lower yield is again obtained.

It has further been found that if the hydride content in the metal falls, the treatment times necessary for de-scaling increase very rapidly. With a hydride content of 1.7%, the treatment time for normal steels amounts on an average to from 15 to 30 seconds, whilst with a lower hydride content, of from 1% to 1.2% for instance, treatment times of from 2 to 4 minutes on an average are required.

Owing to the great affinity of sodium hydride for atmospheric oxygen, it is now found that large immersion vessels, such as are necessary for instance for relatively large run-through installations for the de-scaling of continuous metal bands, can only be brought, according to their size, to a concentration of from 0.8% to 1% hydride content, because the sodium hydride accruing reacts immediately, at the surface of the bath, with the oxygen of the atmosphere. Bath coverings, with finely divided coal, charcoal or graphite for example, have brought hardly any success and have not proved satisfactory, since covered baths of this kind form a great deal of sludge. Solid bath coverings, by means of floating covers or the like, have likewise brought no satisfactory success. Even by means of gas coverings, by nitrogen gas for instance, no economically traceable heightening of the hydride concentration could be attained.

In addition to this it has been experienced in practice that independently of the access of atmospheric oxygen, with an increasing bath volume, a greater decomposition of the hydride content occurs, for which reason, in volumetrically large baths, no high concentration of hydride is obtainable. This gives rise to the further difficulty of installing the number of generators necessary for the attainment of a sufficient hydride concentration in the bath receptacle, without uneconomically increasing the volume of the bath.

Now the present invention is based upon the problem of obviating the defects enumerated above of the processes hitherto known, and providing a method in which, by simple means, as high a concentration of hydride as possible is attained, and a continuous de-scaling, particularly of continuous metal bands, can be economically operated in the shortest possible time.

The method according to the invention, which is likewise based upon the use of alkali metal hydride, is characterised by the spraying of the articles to be cleaned, in a treatment chamber shut off from the atmosphere and freed from atmospheric oxygen, with a molten spray or mist consisting essentially of an alkali metal melt which is enriched with a quantity of alkali metal hydride sufficient for the de-scaling, and the removal from the metal surface of the scale reduced by the hydride treatment by spraying with a liquid that does not attack the surface of the metal.

The advantage of this method consists primarily in the fact that any desired concentration of alkali hydride in the treatment melt can be established, so that in every case a rapid reduction of the oxides is ensured, whereby, in particular, a continuous method of working, with high through-puts, is rendered possible. Experiments have shown that hydride concentrates of about 15% hydride content are more than sufficient to enable the method to be economically carried out.

The spraying of the treatment melt has the advantage over the known immersion methods that for the reduction of the oxidic surface contaminations a substantially smaller quantity of alkali metal hydride is required, as a result of which this method works very economically. Here, however, it is important that the method according to the invention should be carried out in a treatment chamber shut off from the atmosphere and freed from atmospheric oxygen, since otherwise the alkali hydride of the mist of spray might react to a considerable extent with the atmospheric oxygen to form alkali hydroxide, and might thus be lost so far as the actual de-scaling process is concerned.

The scale reduced by the hydride treatment, as contrasted with the still unreduced scale, adheres only slightly to the metal surface, and can be removed from the latter in a manner generally known by spraying with a liquid, such as water, which does not attack the surface of the metal, that is, which behaves neutrally towards the latter.

For the removal of the atmospheric oxygen present in the treatment chamber at the beginning of the process, which may possibly have passed into the chamber during the process in the form of air bubbles adhering to the metal strip, an excess of alkali hydride, not needed for the de-scaling, may, according to a further feature of the invention, be introduced into the treatment chamber with the alkali metal melt, in such a quantity that by reacting with any atmospheric oxygen present to produce alkali hydroxide it will yield an oxygen-free atmosphere.

In order to save having to provide a special container for the reception of the reaction product from the treatment melt with the surface contaminations, the shutting off of the treatment chamber from the atmosphere is effected most simply, according to a further feature of the invention, by collecting the reaction product from the treatment melt with the surface contaminations and at the same time employing it as a liquid seal for sealing the treatment chamber in which the said cleaning treatment is taking place.

The method according to the invention will now be further described with reference to the accompanying drawing, which diagrammatically illustrates one embodiment of the treatment apparatus.

The treatment apparatus, according to this embodiment, which is designed particularly for the de-scaling of a continuous metal strip, consists essentially of a treatment chamber formed by vertically arranged tubes 6 and 7, a container 4 connecting the tubes 6 and 7 with one another at their upper ends, and two liquid-containers 1 and 2, arranged at the lower ends of the tubes 6 and 7 and filled with molten sodium hydroxide, the two tubes 6 and 7 dipping below the surface of the liquid in the containers 1 and 2, and thereby sealing the treatment chamber in an airtight manner from the atmosphere. Through this chamber a metal strip 14 to be cleaned is passed in loops in the direction of the arrow 15. For the guidance of the strip, reversing rollers 10 and 11 are provided, which are mounted inside the liquid containers 1 and 2 and inside the upper vessel 4. Outside the actual apparatus, an entry roller 12 and an exit roller 13, on a level with one another.

In this treatment chambers 1, 6, 4, 7, 2 the metal strip 14 passing through it is sprayed on all sides, by way of spraying nozzles 29 arranged in the chamber, with a fine molten spray or mist of spray, consisting essentially of an alkali metal melt (for instance a sodium melt) enriched with alkali metal hydride (for instance sodium hydride) in such a quantity as is needed for the reduction of the coating of scale on the metal strip.

The duration of treatment required for the reduction of the scale is the shorter, the greater concentration of sodium hydride in the treatment melt. This greater concentration involves at the same time a correspondingly greater speed of transit of the strip through the treatment chamber. Experiments have shown, as is clearly evident from the appended test reports, that about 15% hydride content in the treatment melt is more than sufficient to enable the method according to the invention to be economically carried out.

Now in order to detach the scale reduced by the hydride treatment from the metal strip 14, this metal strip may be sprayed with a liquid, water for instance, which does not attack the metal surface, whereby at the same time a good cooling of the metal strip passing through the sodium hydroxide melt takes place. This may be obtained, as illustrated in the example, in a second treatment chamber, formed by the tubes 8 and 9, the vessel 5 and the liquid containers 2 and 3, by providing, preferably in the connecting tube 9, a further spraying device 32, which is connected to a pressure-water pipe 33, for spraying the metal strip 14 passing round the rollers 10 and 11, with a powerful jet of water. The spraying water running away collects in the liquid container 3, where it constitutes at the same time a liquid seal.

This second treatment chamber is preferably filled with hydrogen gas, in order to obviate any re-oxidation, by atmospheric oxygen, of the cleaned metal surface, which owing to the spraying treatment, and owing to its passage through the sodium hydroxide melt in the two liquid containers 1 and 2, may be at a temperature of about 350°. The sodium hydroxide melt in the liquid container 2, into which the tube 8 likewise dips, prevents the penetration of water vapour into the preceding first treatment chamber.

Any excess water will flow away through an overflow pipe 34 into a discharge passage 35. Furthermore, the liquid containers 1, 2 and 3 are connected by valves 36a 36b and 36c respectively with a discharge pipe 36, to enable the containers to be cleaned, particularly from sludge.

Should scale still adhere to the metallic members to be cleaned, notwithstanding the spraying with water, this can very easily be removed by a slight acid pickling, which may advantageously be effected when passing the metal strip through the liquid container 3 on the outlet side of the treatment apparatus by employing there a dilute acid solution as a liquid seal.

For the preparation of the treatment melt, first of all alkali metal, preferably sodium, is melted in a fusion kettle 16 at about 100° C. The molten metal is then admitted to a pipe line 17 by opening a valve 16a and is brought, by suitably controlling valves 17a, 17b and 17c, into one of three preparation vessels 20, 21 and 22. In this vessel the melt is further heated up to a temperature of about 340° C. Upon this temperature, and the prescribed level of filling, being reached, the preparation vessel 20 or 21 or 22 that has been charged is shut off by closing the corresponding valve 17a, 17b or 17c and hydrogen gas is admitted into a gas-circulating pipe 18 from a gas storage vessel 23 by opening a valve 23a. By a gas-circulating pump 24 the hydrogen is passed in the direction of the arrow 25, and is heated, in its passage through a gas-heater 26, to a temperature of about 450° C. The hot hydrogen is then admitted, by opening one of the valves 18a, 18b or 18c into the associated filled preparation vessel 20, 21 or 22. The hydrogen gas re-ascending out of the melt is led back again into the gas-circulating pipe 18 by way of a corresponding valve 18d, 18e or 18f, and is blown afresh into the preparation vessel by the circulating pump 24.

By this reaction of the alkali metal melt with hydrogen gas, there is very soon effected, under the action of the high temperature, an enrichment with alkali hydride. As soon as the melt has reached the requisite concentration of hydride, the circulation of hydrogen is shut off, the corresponding valves 18a to 18f being closed.

A gas which is inert to the melt is then forced under pressure from a pressure-gas producer 27, through a pipe line 19, by appropriately controlling valves 19a, 19b or 19c, into the associated preparation vessel 20, 21 or 22. By this means the alkali metal melt enriched with alkali metal hydride is supplied, after opening the corresponding valve 28a, 28b or 28c, through a pipe line 28 connected therewith, to the treatment apparatus, and is sprayed on to the strip 14, to be treated, by means of spraying nozzles 29, which may advantageously be installed in the first vertical connecting tube 6.

The melt reacting with the oxidic scale to form alkali hydroxide is caught up again in the liquid containers 1 and 2 filled with molten alkali hydroxide, from which it is admitted through an overflow pipe 30 into an electrolyzer 31, in which pure sodium metal is recovered by electrolysis. The sodium recovered in the electrolyzer 31 is drawn off through a pipe line 17, to be introduced, for re-preparation, into a free preparation vessel 20, 21 or 22.

In the example illustrated, three preparation vessels are shown, whereby it is possible to carry out the filling of the vessel 20, for example, while the filling of the vessel 21 is prepared by reaction with hydrogen gas. At the same time the sodium recovered from the electrolyzer may be collected in the vessel 22. In this way continuous operation is always ensured.

By reference to the appended test reports concerning de-scaling experiments with two different qualities of steel, the hydride concentrations and the treatment times required for de-scaling are indicated, in dependence upon the particular degree of scaling measured, and the composition of the steel:

Test report I

A steel strip of low carbon content (about 0.25% C) was to be de-scaled. The average degree of scaling amounted to from 0.3 to 0.32% of the weight of the strip. The sodium, heated to 370° C. in the preparation vessel 20, was swirled with hydrogen, and brought to an NaH content of 11.7%. The treatment medium was then supplied to the nozzles 29 and sprayed into the chamber 6, about 0.4 kg. NaH per normal cu. m. of the air in the treatment chamber being consumed for binding the atmospheric oxygen and the atmospheric moisture. The strip was thereupon passed through, and was further sprayed. In this, from 33 to 38 percent by weight of NaH, calculated on the weight of scale, was consumed. In the containers 1 and 2 there was sodium hydroxide at 370° C., which heated the strip in transit. The speed of travel of the strip was at first such that it remained about 2.6 seconds in the treatment chamber. After this treatment there were still small particles of scale discoverable on the strip. At a slackened speed, at which the duration of stay in the treatment chamber was 2.8 seconds, the strip was completely freed from scale.

Test report II

A strip of chrome-nickel-steel containing 18% Cr and 8% Ni was to be de-scaled. The average degree of scale amounted to 0.8% of the weight of the strip. The sodium, heated in the vessel 20 to a temperature of 370° C., was swirled with hydrogen, and brought to an NaH content of 12.4%. The treatment medium was then supplied to the nozzles 29 and sprayed into the chamber 6, about 0.4 kg. NaH per normal cu. m. of the air enclosed in the treatment chamber being consumed in order to bind the atmospheric oxygen and the atmospheric moisture. Thereupon the strip was passed through and further sprayed. In doing this, from 36 to 45 percent by weight of NaH, referred to the weight of scale, was consumed. In the containers 1 and 2 there was sodium hydroxide at 370° C., which heated the moving strip. The speed of travel was such that the strip remained 9 seconds in the treatment chamber. There was then a complete cleaning of the strip.

I claim:

1. A method of cleaning metallic articles from oxidic surface contaminations, comprising the steps of spraying the articles to be cleaned, in a treatment chamber shut off from the atmosphere and freed from atmospheric oxygen, with a molten spray consisting essentially of an alkali metal melt enriched with a quantity of alkali metal hydride sufficient for the de-scaling, and then removing the scale, reduced by the hydride treatment, from the surface of the metal, by spraying the articles with a liquid that does not attack the surface of the metal.

2. A method of cleaning metallic articles from oxidic surface contaminations as claimed in claim 1, comprising the further step of introducing into the treatment chamber, with the alkali metal melt, an excess of alkali metal hydride beyond the quantity necessary for the de-scaling, in such quantity as to maintain an oxygen-free atmosphere, by reacting with any atmospheric oxygen present to form alkali hydroxide.

3. A method of cleaning metallic articles from oxidic surface contaminations as claimed in claim 1, comprising the further step of collecting the reaction product from the treatment melt with the surface contaminations, and at the same time employing this reaction product as a liquid seal for shutting off the treatment chamber from the atmosphere.

References Cited

UNITED STATES PATENTS

| | | | |
|---|---|---|---|
| 2,134,457 | 10/1938 | Tainton | 134—15 XR |
| 2,188,930 | 2/1940 | Vincent-Daviss | 134—42 XR |
| 2,311,099 | 2/1943 | Tainton. | |
| 2,359,476 | 10/1944 | Gravely. | |
| 2,372,599 | 3/1945 | Nachtman | 134—15 XR |
| 2,377,876 | 6/1945 | Gilbert | 134—2 |
| 2,717,845 | 9/1955 | Carter | 134—2 |
| 2,891,881 | 6/1959 | Jaffe | 143—2 |
| 3,126,301 | 3/1964 | Faler | 134—2 XR |
| 3,174,491 | 3/1965 | Faler. | |

MORRIS O. WOLK, *Primary Examiner.*

J. ZATARGA, *Assistant Examiner.*

U.S. Cl. X.R.

134—10, 15, 29, 30; 148—20